United States Patent

Cohen

[15] 3,703,607

[45] Nov. 21, 1972

[54] TELEPHONE DIALING AND INFORMATION TRANSMISSION CIRCUIT

[72] Inventor: Herbert I. Cohen, Pt. Pleasant Beach, N.J.

[73] Assignee: Acron Corporation, Lakewood, N.J.

[22] Filed: Aug. 18, 1970

[21] Appl. No.: 64,758

[52] U.S. Cl...................................................179/5 P
[51] Int. Cl............................................H04m 11/04
[58] Field of Search.......................................179/5 P

[56] References Cited

UNITED STATES PATENTS

| | | | |
|---|---|---|---|
| 3,287,500 | 11/1966 | Moore | 179/5 P |
| 3,560,657 | 2/1971 | Stone | 179/5 P |
| 3,544,722 | 12/1970 | Hartfield | 179/5 P |

FOREIGN PATENTS OR APPLICATIONS

| | | | |
|---|---|---|---|
| 997,744 | 7/1965 | Great Britain | 179/5 P |

*Primary Examiner*—Kathleen H. Claffy
*Assistant Examiner*—David L. Stewart
*Attorney*—Robert M. Skolnik

[57] ABSTRACT

The specification discloses a circuit for automatically dialing pre-recorded telephone numbers and transmitting a pre-recorded message to the number dialed. The circuit is triggered by a contact closure indicating an emergency condition. The triggering energizes the recording media drive motor and selects the appropriate information track on the recording media for connection to the telephone lines. Dialing is accomplished by a relay driving arrangement which amplifies pre-recorded dial pulse information and attenuates the message information.

1 Claim, 4 Drawing Figures

INVENTOR
HERBERT I. COHEN
BY [signature]
ATTORNEY

INVENTOR
HERBERT I. COHEN
BY [signature]
ATTORNEY

TELEPHONE DIALING AND INFORMATION TRANSMISSION CIRCUIT

This invention relates generally to a reporting device and particularly to an electronic circuit for automatically "dialing" pre-recorded telephone numbers and transmitting prerecorded messages to the selected number upon the occurence of a particular emergency such as for example, fire or burglary.

The prior art has approached the problem of alarm generation using automatic telephone calls to the appropriate municipal authorities in several different ways generally dependent upon the number of information channels used. In the typical prior art device, a tape recorder mechanism is provided for storing both the dial pulse information ad the audio message to be transmitted to any particular telephone number. Some automatic condition sensing device such as one responsive to temperature or motion is connected to activate the tape unit to "dial" the number and transmit the appropriate message. The sensing, dialing, and transmission are generally accomplished silently in the case of the intruder detection unit so as not to alert the intruder. In other situations such as fire, sensing may also be accompanied by an audible signal to alert the occupants of the premises as well as the appropriate municipal emergency unit.

Typical devices of the prior art employ either two, four or eight track tape systems using paired channels for recording the desired dial pulse information on one channel and the audio or message information on another channel. The greater the number of channels, the greater the amount of information storage capability available to the user.

Detection of the telephone number and message information with such prior art tape arrangements has proven exceedingly complex especially where different parts of a message are recorded on different tracks. Detection on these multitrack systems requires separate circuits for amplification of the telephone number and audio information as well as having limitations in utilization of recording media.

The present invention provides a simplified electronic circuit enabling the use of a two track tape arrangement where both telephone and message information are recorded on each track as a number of channels. The circuit separates the dial pulse information and the audio information for each complete message unit, performs dialing, and appropriately transmits the audio information to the telephone lines. In brief, dial pulse information is recorded on a magnetic tape unit as 6KHz pulses at the saturation amplitude of the tape. The audio message information is recorded at a lower amplitude less than saturation. Two tracks for information are provided; each track being selectable as a function of a different control event. A triggering circuit responds to the occurence of a particular event by energizing the circuit and selecting the appropriate track. The dial pulse information is first amplified by an audio amplifier whose output is connected to a series resonant circuit which further amplifies the dial pulses while attenuating the audio information. Dialing is accomplished via a relay. Audio information is then transmitted to the desired number. A unique stop arrangement is provided to sense the end of a particular message and stop the circuit.

It is a principal object of the present invention to provide an automatic dialing circuit which has high reliability though employing simplified circuitry.

A further object of the present invention is the provision of an automatic dialer which provides full utilization of the recording media.

Another object of the present invention is the provision of stopping means which senses the end of the desired message and de-energizes the circuit.

These as well as further objects and advantages of the present invention will be apparent to those skilled in the art from a reading of the following detailed specification reference being made therein to the accompanying drawings in which.

Figure 1:
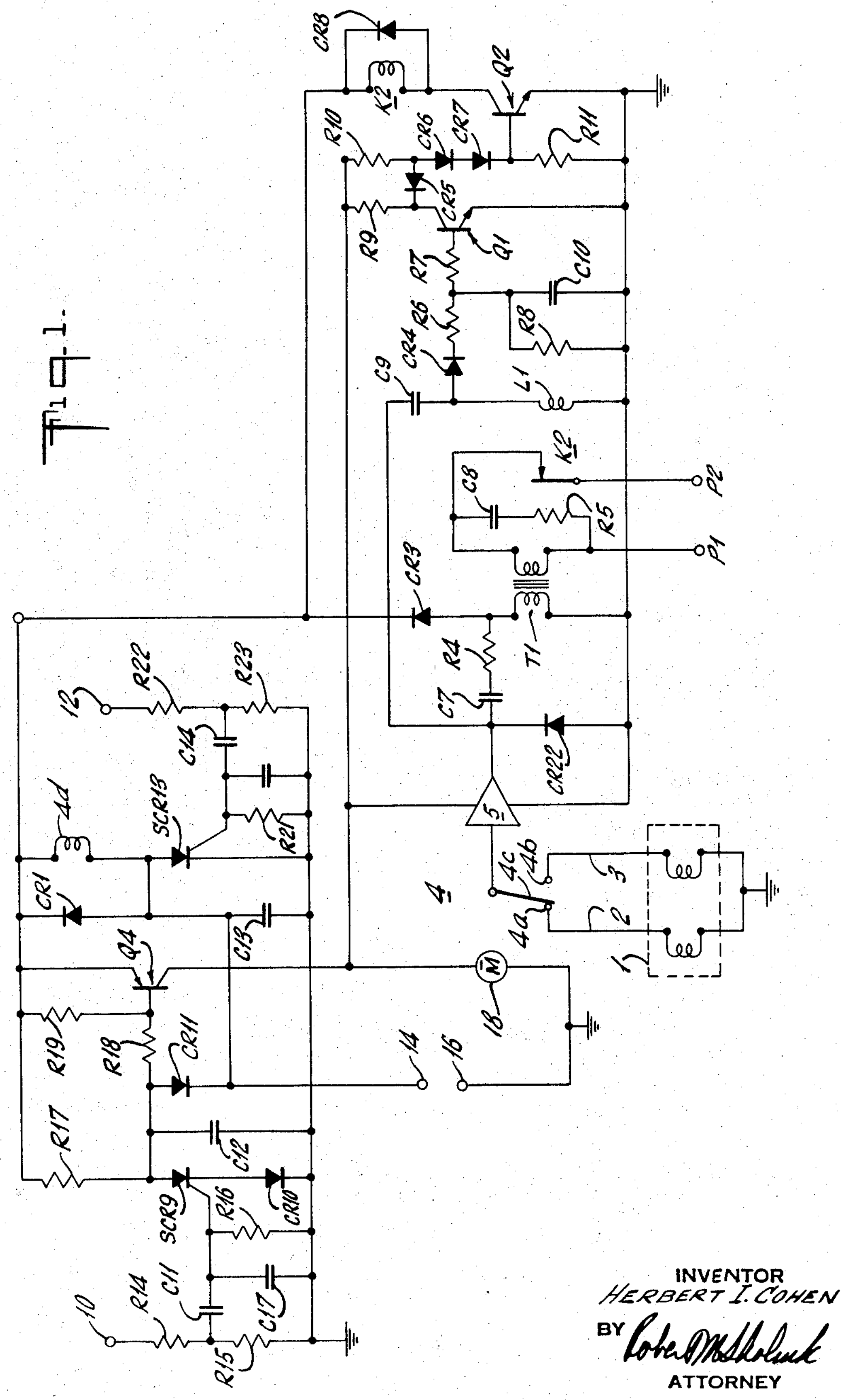
FIG. 1 is a schematic diagram of the preferred embodiment of the invention.

In the drawing, numeral 1 denotes a stereo head for a magnetic tape unit which may be of a type conventional the art. A motor 18 drives the tape past the head. Electrical leads 2 and 3 are connected between head 1 and stationary contacts 4*a* and 4*b* of relay 4. It will be understood that two tracks may be recorded on the tape so that information recorded on one track is available on electrical lead 2 while information recorded on the other track is available on lead 3. Relay 4 selects one or the other of the two tracks for further processing by the circuit. Energization of moveable contact 4*c* of the relay 4 is provided by a coil 4*d*. A diode CR1 is connected across the relay coil in the conventional manner to clamp the reverse transient generated by the collapse of the field in coil 4d when the relay changes from one position to the other. The conditions under which relay 4 will be connected to either leads 2 or 3 will be described in further detail below.

The output of the track selected by relay 4 is amplified by an audio amplifier 5. Amplifier 5 is of a type available from Amperex Corp. under the model designation TAA300. The output of amplifier 5 is connected to a signal separation circuit which separates the dial pulse information from the audio information. More particularly, the primary winding of a transformer T1 is connected to the output of amplifier 5 via the series connection of resistor R4 and a capacitor C7. Capacitor C7 blocks any DC component in the amplifier output from the transformer while resistor R4 provides impedance matching as will be further described below.

Clamping diode CR2 is connected between the output of amplifier 5 and ground to protect the amplifier from voltage surges. Diode CR3 also clamps the output of amplifier 5 to the supply voltage B+ to protect the amplifier. The output of amplifier 5 is also connected to a series resonant circuit composed of capacitor C9 and inductor L1. The circuit is resonant at the frequency of 6KHz, so that all frequencies above and below 6KHz are attenuated. The output of the series resonant circuit is connected to the base of a switching transistor Q1 via an envelope detection and delay circuit to be described below. Detection of the envelope of the 6KHz dial pulse information is accomplished by diode CR4 by half wave rectification in the conventional manner. A threshold voltage level set by resistors R6, R7, and R8 prevent transistor Q1 from triggering on the audio information which has been attenuated in amplitude.

In addition to setting the threshold level, resistor R7 provides isolation between capacitor C10 and transistor Q1.

Figure 3A:
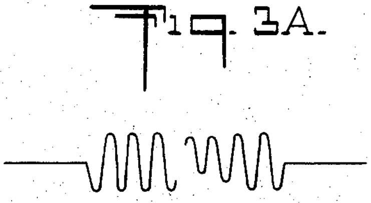
FIG. 3A and 3B are diagrams of waveforms useful in understanding the invention.
Figure 3B:
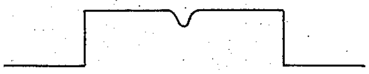

The RC time constant of resistor R6 and capacitor C10 smooths the 6KHz dial pulse information to correct for any tape drop-outs which may occur. This is best illustrated by reference to FIG. 3, waveforms A and B. Waveform A shows a 6KHz dial pulse signal having a discontinuity or tape drop out. Waveform B is taken from the juncture of resistor R6 and capacitor C10 and illustrates the smoothing effect of these elements on the tape drop out. The threshold for actuation of switch Q1 is set such that the switch will be controlled by the 6 KHz dial pulse information and not the audio information. The occurrence of this dial pulse signal renders transistor Q1 conductive, thereby rendering non-conductive transistor Q2 and disconnecting relay K2 from the telephone lines. More particularly, diode CR5 is connected between the collecter of transistor Q1 and the anode of diode CR6. Diodes CR6 and CR7 provide noise immunity, and diode CR5 permits the collector of transistor Q1 to reach the value of the power supply and also provide noise immunity. Resistor R11 provides a leakage path for transistor Q1 when Q1 is rendered non-conductive. Resistor R9 is the collecter load for Q1 while resistor R10 supplies base current for transistor Q2.

The portion of the circuit thus far described serves to control the energization of relay K2 such that dial pulse information in the form of 6KHz pulses may perform dialing.

Capacitor C8 and resistor R5 provides filtering for contact protection of relay K2.

Energization of the entire circuit is accomplished by the structure shown in the upper portion of the FIG. 1. An alarm actuation is provided by a contact closure at either of input 10 or 12. Input 10 selects the first tract of the tape while input 12 may be connected to an intruder detection device. Terminal 10 is connected to a filter network consisting of resistors R14, R15, and capacitors C11, C17. The filter prevents energization of the alarm by transients which may appear at the input 10. A similar filter consisting of resistors R22, R23 and capacitors C14, C15 is provided for terminal 12.

Resistor R14 and capacitor C11 constitute an integrating circuit. Resistor R15 provides a discharge path for capacitor C11 when the control signal at terminal 10 is removed. Resistor R16 provides a discharge path for capacitors C11 and C17 while the signal at terminal 10 is present. Capacitor C17 delays the rise of the voltage applied to the gate element of SCR9.

Resistors R21, R22, R23 and capacitors C14 and C15 will be seen to perform similar functions for terminal 12.

A silicon controlled rectifier (SCR) is provided for each track. SCR9 has its gate element connected to the output of the first mentioned filter network. Resistor R16 is connnected between the gate of SCR9 and ground to reduce leakage current to prevent the element from floating. A diode CR10 connects the cathode of SCR9 to ground to cancel the drop developed across diode CR11. Equal valued capacitors C12 and C13 are connected between the anodes of SCR9 and SCR13 and ground to prevent false latching of the SCR's. Resistor R18 limits the base current to transistor Q4 when A4 is conducting while resistor R19 sets the cut off bias for transistor Q4.

It can be seen that when transistor Q4 conducts, the supple voltage B+ will be applied to the remainder of the circuit. Firing of SCR13 can now be seen to control the track select relay 4 described above. More particularly the coil *4d* of relay 4 is connected between the supply B+ and the anode of SCR13. Firing of SCR13 thus sets relay 4 to the track two position. Q4 conducts when SCR13 fires via the path between ground, the cathode and anode of SCR13 and the cathode and anode of diode CR11.

The circuit thus far described is seen to provide two separate information tracks. Each track contains dial pulse information recorded at 6KHZ. The 6KHz signal is recorded at saturation amplitude (i.e. the maximum amplitude possible on the tape); then follows audio information recorded at a lower amplitude (i.e. below saturation).

Depending upon which of the input 10 or 12 is energized, either SCR9 or SCR13 fires causing appropriate connection of track select relay 4 as well as application of power to the remaining portion of the circuit via the switching transistor Q4.

The 6KHz dial pulse information is amplified and pulsing of relay K2 automatically dials the number. The audio message is transmitted to the telephone lines.

An important feature of the present invention resides in circuitry for stopping the system after the desired message has been transmitted. Contacts 14 and 16 are provided in mechanical proximity to the recording head such that they virtually touch the tape. A small piece of electrically conductive material is placed on the tape by appropriate adhesive. When the conductive material meets contacts 14 and 16 a conductive path may be traced from ground via contact 16 to contact 14 and thence to the cathode of diode CR11. Grounding of this diode causes a sudden drop in current supplied to SCR's 9 and 13 rendering these elements non-conductive. Even though SCR's 9 and 13 are non-conductive, transistor Q4 is maintained conductive so that the conductive material is driven past the tape sense contracts 14 and 16 since the current supplied to the base of transistor Q is uninterrupted. Ungrounding of diode CR11 removes the current path to the base of transistor Q4, thereby rendering this element non-conductive.

Figure 2:
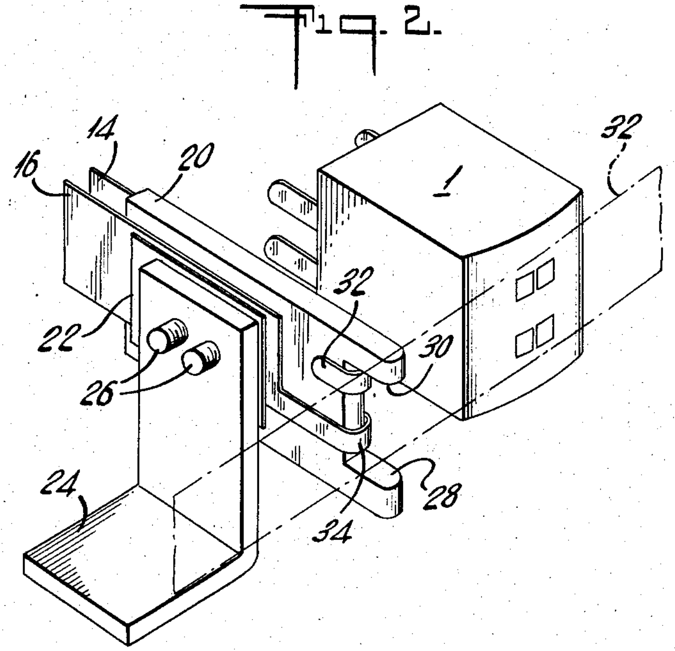
FIG. 2 is an isometric view of a portion of the tape stop mechanism employed in the invention.

FIG. 2 shows the tape sense switch discussed above. More particularly, magnetic read-record head 1 has tape sense contacts 14 and 16 mounted on bracket 28 in proximity to the path of travel of a magnetic recording tape. The tape travels in the notch in insulating block 20 formed by protrusions 28 and 30. Contacts 14 and 16 have bent end portions 32 and 34.

the e entire assembly is electrically insulated from bracket 24 by insulator 22. Rivets or screws 26 hold the assembly together. It can now be seen that a strip of conductive material on the tape will complete the circuit between portions 32 and 34 of contacts 14 and 16.

The circuits is connected to the telephone lines via output connectors P1 and P2. More particularly connector P1 is coupled to the parallel combination of the secondary winding of transformer T1 and a filter comprised of resistor R5 andcapacitor C8. The moveable contact of dial relay K2 is connected between output connector P2 and the secondary winding of transformer T1. Transformer T1 provides DC isolation between the telephone lines and the output of amplifier 5 as well as impedance matching the amplifier output to the telephone lines.

2. A circuit for dialing prerecorded dial pulse information and transmitting a prerecorded audio message thereto said circuit comprising: two channel storage means for storing dial pulse information and audio information on each channel, control means connected to said storage means, for selecting one or the other of said channels, said control means including first and second input terminals for receiving control inputs indicating which of said channels is to be selected, first and second switch means connected to respectively said first and second input terminals and to said storage means, said respective switch means being energized upon the occurrence of a control signal at its respective terminal, for selecting one or the other of said channels, third switch means including transistor means connected to both said first and said second switch means, said third switch means being energized when either of said first of said second switch means are energized for applying energizing signals to said storage means, two output terminals for connection to telephonelines, a signal separation circuit connected to said storage means for amplifying said dial pulse information and attenuating said audio information, said signal separation circuit including transformer means connected to said storage means for coupling said dial xlse information to said output terminals, resistor and capacitor means connected between said storage means and said transformer means for providing impedance matching and direct current blocking, pectively, resonant circuit means connected to said transformer means for attenuating all frequencies other than the frequency of said dial pulse information envelo detection means connected to said resonant circuit means for detecting the envelope of said dial pulse information and switch means connected to said resonant circuit means and to said detection means for connecting and disconnecting the output of said resonant rcuit means to said output terminals, means connected to said separation circuit for producing said audio information d means to stop said storage means after said audio information has been transmitted said stopping means including first and second contacts cated in proximityo said magnetic storage media,said first contact being connected toround and said second being connected to said first and second switch means, electrically conductive material mounted on said magnetic-storage media for momentarily completing an electrical path between said first and second contacts rendering said first and second switch means non-conductive, and diode means connected in shunt relationship with said trans-istor means, and to said second contact for maintaining said transistor means conductive until said electrically conductive material passes beyond said contacts. SCR's 9 and 13 rendering these elements non-conductive. Even though SCR's 9 and 13 are non-conductive, transistor Q4 is maintained conductive so that the conductive material is driven past the tape sense contracts 14 and 16 since the current supplied to the base of transistor Q4 is uninterrupted. Ungrounding of diode CR11 removes the current path to the base of transistor Q4, thereby rendering this element non-conductive.

FIG. 2 shows the tape sense switch discussed above. More particularly, magnetic read-record head 1 has tape sense contacts 14 and 16 mounted on bracket 28 in proximity to the path of travel of a magnetic recording tape. The tape travels in the notch in insulating block 20 formed by protrusions 28 and 30. Contacts 14 and 16 have bent end portions 32 and 34.

The entire assembly is electrically insulated from bracket 24 by insulator 22. Rivets or screws 26 hold the assembly together. It can now be seen that a strip of conductive material on the tape will cmplete the circuit between portions 32 and 34 of contacts 14 and 16.

The circuit is connected to the telephone lines via output connectors P1 and P2. More particularly connector P1 is coupled to the parallel combination of the secondary winding of transformer T1 and a filter comprised of resistor R5 and capacitor C8. The moveable contact of dial relay K2 is connected between output connector P2 and the secondary winding of transformer T1. Transformer T1 provides DC isolation between the telephone lines and the output of amplifier 5 as well as impedance matching the amplifier output to the telephone lines.

I claim:

1. A circuit for dialing prerecorded dial pulse information and transmitting a prerecorded audio message thereto said circuit comprising: two channel storage means for storing dial pulse information and audio information on each channel, control means connected to said storage means, for selecting one or the other of said channels, said control means including first and second input terminals for receiving control inputs indicating which of said channels is to be selected, first and second switch means connected to respectively said first and second input term.nals and to said storage means, said respective switch means being energized upon the occurrence of a control signal at its respective terminal, for selecting one or the other of said channels, third switch means including transistor means connected to both said first and said second switch means, said third switch means being energized when either of said first of said second switch means are energized for applying energizing signals to said storage means, two output terminals for connection to telephone lines, a signal separation circuit connected to said storage means for amplifying said dial pulse information and attenuating said audio information, said signal separation circuit including transformer means connected to said storage means for coupling said dial pulse information to said output terminals, resistor and capacitor means connected between said storage means and said transformer means for providing impedance matching and direct current blocking, respectively, resonant circuit means connected to said transformer means for attenuating all frequencies other than the frequency of said ial pulse information envelope detection means connected to said resonant circuit means for detecting the envelope of said dial pulse information and switch means connected to said resonant circuit means and to said detection means for connecting and disconnecting the output of said resonant circuit means to said output terminals means connected to said separation circuit for producing said audio information and means to stop said storage means after said audio information has been transmitted said stopping means including first and second contacts located in proximity to said magnetic storage media, said first contact being connected to ground and said second contact being connected to said first and second switch means, electrically conductive material mounted on said magnetic storage media for momentarily completing an electrical path between said first and second contacts rendering said first and second switch means non-conductive, means, and to said second contact for maintaining said transistor means conductive until said electrically conductive material passes beyond said contacts.

* * * * *